(12) United States Patent
Takizawa et al.

(10) Patent No.: US 7,654,367 B2
(45) Date of Patent: Feb. 2, 2010

(54) ACTUATOR UNIT FOR A HYDRAULIC BRAKE

(75) Inventors: Shinichi Takizawa, Osaka (JP); Tatsuya Matsuchita, Osaka (JP)

(73) Assignee: Shimano Inc., Sakai, Osaka (JP)

( * ) Notice: Subject to any disclaimer, the term of this patent is extended or adjusted under 35 U.S.C. 154(b) by 355 days.

(21) Appl. No.: 11/400,969

(22) Filed: Apr. 7, 2006

(65) Prior Publication Data

US 2006/0278031 A1    Dec. 14, 2006

(30) Foreign Application Priority Data

Jun. 14, 2005    (EP)    ................... 05012773

(51) Int. Cl.
*B60L 3/00*    (2006.01)
(52) U.S. Cl. .................................... 188/24.22
(58) Field of Classification Search ............. 188/24.22, 188/24.11–24.15, 24.19; 60/594; 74/525, 74/502.2, 502.6, 522
See application file for complete search history.

(56) References Cited

U.S. PATENT DOCUMENTS

| | | | | |
|---|---|---|---|---|
| 4,779,482 A | * | 10/1988 | Kawaguchi | ................... 74/523 |
| 5,050,381 A | * | 9/1991 | Matsuno et al. | ................ 60/584 |
| 5,636,518 A | * | 6/1997 | Burgoyne et al. | ............. 60/594 |
| 5,813,501 A | * | 9/1998 | Terry, Sr. | ..................... 188/344 |
| 2003/0183038 A1 | | 10/2003 | Cornolti | |
| 2005/0199450 A1 | * | 9/2005 | Campbell et al. | ........ 188/24.15 |

FOREIGN PATENT DOCUMENTS

| | | |
|---|---|---|
| DE | 89 13 278.5 | 5/1990 |
| DE | 100 17 199 A1 | 10/2001 |
| EP | 1160152 | 12/2001 |
| FR | 2.024.653 | 8/1970 |

* cited by examiner

*Primary Examiner*—Xuan Lan Nguyen
(74) *Attorney, Agent, or Firm*—Jeffer Mangels Butler & Marmaro LLP

(57) ABSTRACT

An actuator unit for a hydraulic brake mechanism on two-wheelers, comprising a housing fastened to the handlebar, a brake cylinder being arranged substantially perpendicular to the handlebar in the housing, a piston movable in it and a brake lever acting on the piston at an intermediate portion remote from either end of the lever, the lever being mounted at one end thereof to rotate relative to the housing, wherein the brake lever is mounted adjustably movable with respect to an axis substantially at an end of the lever, the axis being unchangeable in position but rotatably mounted to the housing, the adjustment option being provided for by the adjustment mechanism, wherein the lever, the adjustment mechanism and the axis rotate together relatively to the housing upon operation.

16 Claims, 3 Drawing Sheets

ACTUATOR UNIT FOR A HYDRAULIC BRAKE

FIELD OF THE INVENTION

The invention concerns an actuator unit for a hydraulic brake on two-wheelers.

BACKGROUND OF THE INVENTION

In recent years, certain high performance bicycles have included hydraulic brakes. The reach adjustment for the brake levers for these types of brakes are typically complicated and involve expensive components.

It is therefore a task of the invention to design an actuator unit of a hydraulic brake, so that adjustment of the reach occurs by simple, cost-effective parts that are easy to install.

SUMMARY OF THE PREFERRED EMBODIMENTS

The task is solved according to the invention in that the actuator unit for a hydraulic brake mechanism comprises a housing configured to be attached to the handlebar, a brake cylinder arranged to be configured substantially perpendicular to the handlebar in the housing, a piston configured to be moved in the brake cylinder, a brake lever configured to be pivotably attached to the housing to rotate about an axis of rotation, the brake lever being operatively associated with the piston to move the piston, and a reach adjustment mechanism configured to be operatively associated with the brake lever to move the brake lever for selecting a starting position of brake lever, wherein the axis of rotation of the brake lever is unchangeable in position respect to the housing, and wherein the reach adjustment mechanism moves the brake lever with respect to the axis of rotation of the brake lever.

As an example the brake lever may be mounted adjustably movable with respect to an axis substantially at an end of the lever, the axis being rotatably mounted to the housing, the adjustment option being provided for by the adjustment mechanism, wherein the lever, the adjustment mechanism and the axis rotate together relative to the housing.

Changing the relative position of the lever with respect to the fixed axis of rotation during operation of the brake lever is simpler than adjusting the moving linkage between the lever and the piston. Additionally, it has been found that movement of the lever is particularly improved in such a configuration where the lever is configured to be journaled at one end, to be operated substantially at an opposite end and acting onto the hydraulic braking mechanism between the two ends if reach adjustment is provided for at the end the lever is journaled with. The rotational axis is preferably the center axis of the journal, on which the brake lever is mounted to rotate. Preferably the brake lever is mounted adjustably relatively to the axis of rotation of the brake lever, in particular the mounting being adjustable substantially parallel to the center axis of the brake cylinder, when the brake lever is in a position corresponding to a half stroke.

In a preferred embodiment the reach adjustment mechanism comprises an adjustment bolt, a journal configured to be operatively associated with the adjustment bolt, wherein the journal has a through hole for receiving the adjustment bolt extending there through. Accordingly the lever is guided by the adjustment mechanism allowing for well defined positioning of the lever.

In a particular embodiment the axis of rotation is the center axis of the journal on which the brake lever is mounted to rotate.

The through hole is preferably provided with internal threads, such that reach adjustment can be easily obtained by a rotation of the adjustment mechanism. It is to be noted that other means could be provided for allowing setting of the relative position between the adjustment mechanism such as a bolt and the journal.

The lever may comprise at least one elongated recess or hole for receiving the journal in a guided manner, in particular the elongated hole(s) extending roughly parallel to the center axis of the brake cylinder when the lever is in a position corresponding to a half stroke or preferably to a position corresponding to an intermediate selected start position of the brake lever. Hence, the lever can be guided in a manner as to be guided commonly by the adjustment mechanism and the elongated hole or holes.

The elongated hole (s) can be configured as having ends formed in both directions as stops for the journal. Accordingly the journal can be guided on both sides in the lever in elongated holes that extend roughly parallel to the center axis of the brake cylinder when the lever is in a position corresponding to a half stroke and have ends designed in both directions as stops for the journal. Because of this, the adjustment range of the grip width is limited in simple fashion by design and surpassing of this range is not possible. The production of elongated holes by machining or in a deformation process is very simple.

In a preferred embodiment the adjustment mechanism is comprised of a bolt abutting with the lever on an upper and lower part thereof. This configuration allows for a well defined positioning of the lever substantially without any play, regardless of whether the lever is in an end position or an intermediate position with respect to it's adjustability.

In order to construct the inventive device small and having a nice appearance the lever may be provided with recesses forming abutment regions for the bolt. Accordingly, the heads of the bolt may be received substantially flush with the surrounding surface of the lever.

According to a preferred embodiment the adjustment mechanism comprises indexing means. Such indexing means could be corrugations between any of the heads of the bolt and the housing or other suitable well known means for indexing relative rotational positions.

The lever can comprise a recess of conical shape with rounded apex for engaging the piston. Thus in contrast to the prior art there is provided for uncomplicated actuation of the piston resulting from the fact that the inventive structure provides for adjustability substantially without impairing structural behaviour of the journal supporting the one end of the lever. Thus there is no substantial need for additional guiding of the lever at the place the piston is operated. Nevertheless it is to be noted that such additional guiding may be provided for.

As the reach adjustment is provided for at small distance from the interaction of the lever with the piston it is preferred that the piston is provided with a ball shaped end for engaging the brake lever. Thus easy engagement and operation can be guaranteed.

A preferred embodiment of the invention will now be explained below in detail, with reference to the drawings. The description is to be regarded as illustrative only and should not be understood to restrict the scope of protection as defined by the claims.

DETAILED DESCRIPTION OF THE PREFERRED EMBODIMENTS

Figure 1:
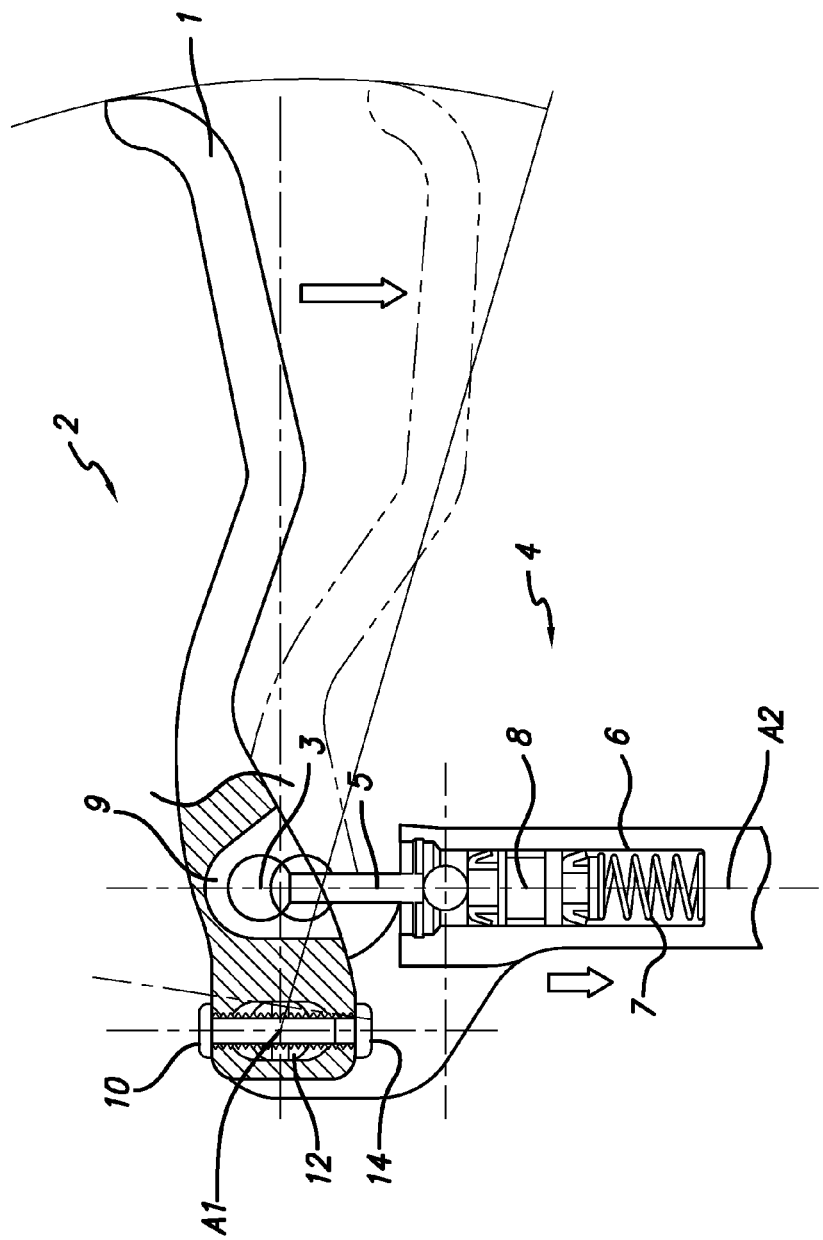
FIG. 1 shows a preferred embodiment of the actuator unit in an intermediate adjustment position.

An actuator unit 2 is fastened to the handlebar 15 of a two-wheeler. It is connected by means of a line to a hydraulic brake (not shown) for braking of the vehicle. It can be a disk brake or a rim brake. The housing 4 of the device 2 is fastened on the handlebar with a clamp fitting or other suitable fixation. A hole 6 in housing 4 extends essentially perpendicular to the handlebar 15. Its end on the handlebar side is closed, its end facing away from the handlebar 15 is open. The hole 6, in its internal part, forms the brake cylinder 7.

The actuator unit in an intermediate adjustment position is illustrated in detail in FIG. 1. The actuator unit 2 is substantially composed of a housing 4 and a lever 1. In the housing there is provided a hole 6 forming the brake cylinder 7, which defines an axis A2, and in which is guided a master piston 8, which is operated by a piston rod 5 being provided on its end with a spherical portion 3. The brake lever 1 is journaled with one end to the housing 4 in order to be pivotable for pushing downwardly the spherical body 3 and thus the piston rod 5 in order to in turn activate the master piston 8. The brake lever 1 is provided on the end portion that is intended to be journaled to the housing with an elongated hole in which a journal axle is received.

The journal axle 12 is mounted rotatably in or to the housing 4 and extends through the elongated hole. The journal axle 12, which defines the pivot axis A1, is provided with a through hole to which an adjustment bolt formed of two parts 10 and 14 is arranged. By means of the adjustment bolt the position of the axle 12 within the elongated hole of the brake lever 1 can be secured in any number of possible positions such that the brake lever 1 is journaled pivotally to the housing 4.

In the position shown in FIG. 1, the pivot or journal axle 12 is positioned substantially in the middle of the elongated hole meaning as much as that the brake lever is configured to be arranged in an intermediate position, thus providing for a medium reach adjustment. Upon operation of the brake lever a conical recess 9 provided in the brake lever 1 with a rounded apex urges the spherical body downwardly to operate the piston rod and, accordingly, the master piston, in order to provide for the hydraulic braking function.

Figure 2:
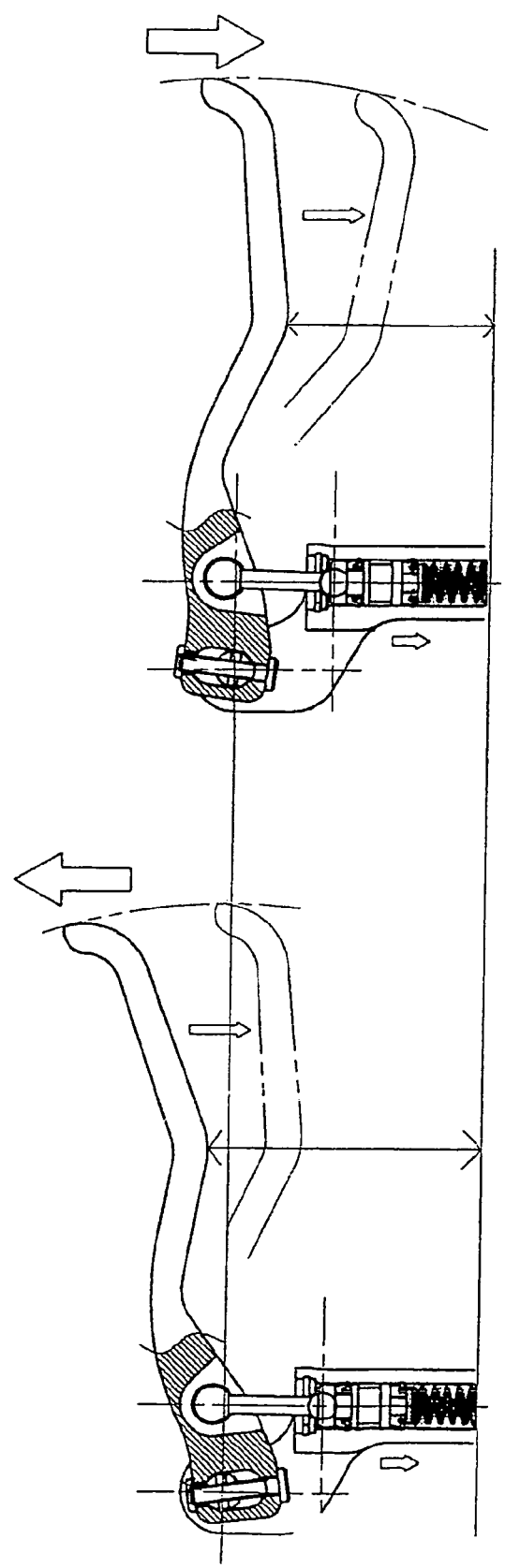
FIG. 2 shows the preferred embodiment of the actuator unit in an adjustment position corresponding to maximum reach and to minimum reach, respectively.

On the left hand side of FIG. 2 the embodiment as shown in FIG. 1 is represented, however with the lever 1 in a position of a maximum reach adjustment. Accordingly, the end portion of lever 1 is journaled with the housing 4 such that the journaled end portion is slightly closer to the handlebar than in the position, as illustrated in FIG. 1, resulting in that the distal end portion is further remote from the handle bar. As shown in FIG. 2 the pivot axle 12 is located in a rounded end of the elongated hole, thus providing for the maximum reach adjustment position.

On the right hand side of FIG. 2 the embodiment shown in FIG. 1 is again illustrated, however this time the lever 1 is in the minimum reach adjustment position. Accordingly, the brake lever 1 is positioned such that the relative position of the axle 12 is on the bottom end of the elongated hole provided for in the brake lever 1. Accordingly, the brake lever is slightly rotated in a clockwise direction when compared to the illustration of FIG. 1. Thus a user having small hands can operate the brake lever.

In summary, it is to be noted that the invention provides for very uncomplicated and inexpensive reach adjustment having the great advantage of not needing any intervention with respect to the hydraulic cylinder piston arrangement in a very easy and convenient manner. The pivot axle always remains in the same position of the housing solely being rotatable in this respect in order to allow in the respective reach adjustment positions common rotation of the axle, the brake lever and the adjusting mechanism.

The inventive configuration has also proven to be particularly beneficial in that, during the reach adjustment, the movement behaviour of the brake lever is slightly changed which change surprisingly copes well with the needs of a user in correspondence of the selected reach adjustment. Furthermore, the provision of the reach adjustment mechanism in a rotatable fashion together with the axle reduces any risks of inadvertent change of the adjustment position as it can occur with any reach adjustment known in the prior art.

Figure 3:
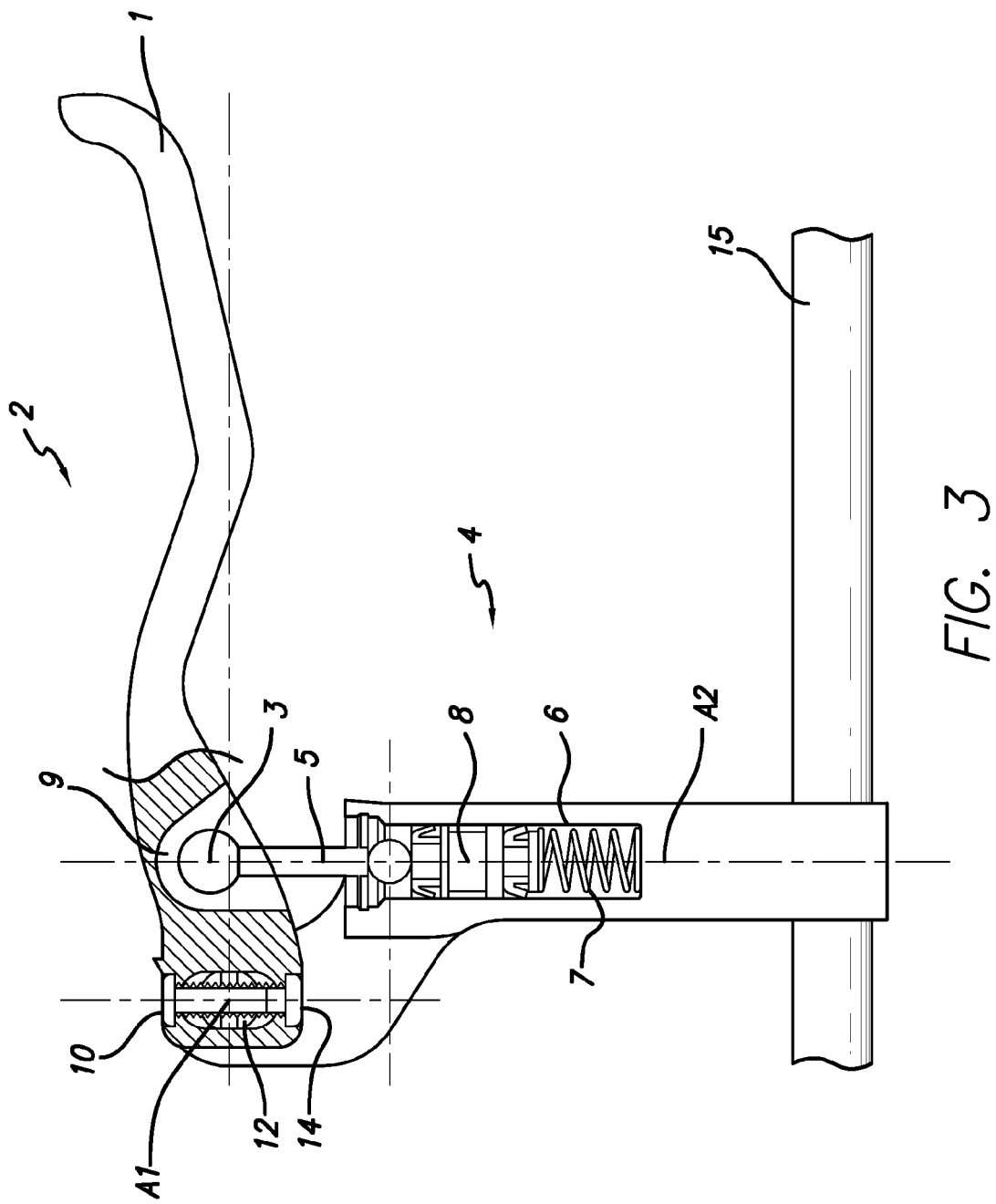
FIG. 3 shows the preferred embodiment of the actuator unit where the brake cylinder is substantially perpendicular to the handlebar.

Various changes and modifications could be envisaged such as to provide the respective heads of the bolt portions 10, 14 in matching recesses of the brake lever (as shown in FIG. 3) which recesses may for instance also be provided with indexing means such as corrugated surfaces in order to provide for indexing function of the reach adjustment.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. An actuator unit for a hydraulic brake mechanism, the actuator unit comprising:
   a housing configured to be attached to a handlebar,
   a brake cylinder arranged to be configured substantially perpendicular to the handlebar in the housing,
   a piston disposed in the brake cylinder,
   a brake lever pivotably attached to the housing that is rotatable about an axis of rotation, the brake lever being operatively associated with the piston to move the piston, and
   a reach adjustment mechanism operatively associated with the brake lever that is configured to move the brake lever to select a starting position of the brake lever,
   wherein the axis of rotation of the brake lever is unchangeable in position with respect to the housing, and the reach adjustment mechanism moves the entire brake lever with respect to the axis of rotation of the brake lever, such that a different portion of the brake lever is coaxial with the axis of rotation of the brake lever after reach adjustment than was coaxial with the axis of rotation of the brake lever before reach adjustment.

2. The actuator unit according to claim 1, wherein the reach adjustment mechanism comprises an adjustment. bolt and a journal operatively associated with the adjustment bolt, wherein the journal has a through hole for receiving the adjustment bolt.

3. The actuator unit according to claim 2, wherein the axis of rotation is the center axis of the journal on which the brake lever is mounted to rotate.

4. The actuator unit according to claim 2, wherein the through hole is threaded.

5. The actuator unit according to claim 2, wherein the lever comprises at least one elongated hole for receiving the journal in a guided manner, and wherein the elongated hole extends substantially parallel to the center axis of the brake cylinder when the lever is in a position corresponding to an intermediate selected start position of the brake lever.

6. The actuator unit according to claim 5, wherein the elongated hole is partially defined by ends formed in both directions as stops for the journal.

7. The actuator unit according to claim 2, wherein the elongated hole has a top and a bottom, and wherein the journal abuts the top or bottom of the elongated hole when the lever is in a position corresponding to a maximum or minimum selected start position of the brake lever, respectively.

8. The actuator unit according to claim 7, wherein the adjustment bolt includes an abutment part on each end thereof, and wherein the lever is provided with recesses for receiving the abutment parts of the bolt.

9. The actuator unit according to claim 1, wherein the reach adjustment mechanism comprises an indexing mechanism.

10. The actuator unit according to claim 1, wherein the lever comprises a recess of conical shape with a rounded apex.

11. The actuator unit according to claim 10, further comprising a piston rod, wherein the piston rod is provided with a ball shaped end for engaging the brake lever.

12. The actuator unit according to claim 1, wherein the reach adjustment mechanism comprises a journal, and wherein the axis of rotation of the brake lever is the center axis of the journal.

13. An actuator unit for a hydraulic brake mechanism, the actuator unit comprising:

a housing configured to be attached to a handlebar, wherein the housing defines a brake cylinder having a piston disposed therein1 and wherein the brake cylinder defines a center axis, a brake lever pivotably attached to the housing and rotatable about an axis of rotation, the brake lever being operatively associated with the piston, wherein the brake lever comprises at least one elongated hole, and a reach adjustment mechanism operatively associated with the brake lever, wherein the reach adjustment mechanism is adapted to vary the distance between the brake lever and the handlebar without changing the position of the axis of rotation with respect to the housing, wherein the reach adjustment mechanism comprises a journal that is received in the elongated hole of the brake lever such that the brake lever can move with respect to the journal, wherein the axis of rotation of the brake lever is the center axis of the journal.

14. The actuator unit of claim 13, wherein the reach adjustment mechanism comprises an adjustment bolt, and wherein the journal is operatively associated with the adjustment bolt, wherein the journal is connected to the housing and has a through hole for receiving the adjustment bolt.

15. The actuator unit of claim 14 wherein the through hole is threaded.

16. The actuator unit of claim 13 wherein the brake lever defines at least a maximum reach adjustment start position, an intermediate start position and a minimum reach adjustment start position, and wherein the elongated hole extends substantially parallel to the center axis of the brake cylinder when the brake lever is in the intermediate start position.

* * * * *